United States
Novak

[11] 3,878,330
[45] Apr. 15, 1975

[54] OPTICAL VIEWING SYSTEM
[75] Inventor: Warren D. Novak, Chappaqua, N.Y.
[73] Assignee: The Mosler Safe Company, Hamilton, Ohio
[22] Filed: Apr. 1, 1974
[21] Appl. No.: 456,861

[52] U.S. Cl. ........ 178/7.92; 178/DIG. 30; 350/187; 350/58
[51] Int. Cl. ..................... G02b 15/18; H04n 5/26
[58] Field of Search... 178/7.89, 7.91, 7.92, DIG. 30; 350/186, 187, 239, 241; 355/56, 58, 59

[56] References Cited
UNITED STATES PATENTS

| | | | |
|---|---|---|---|
| 895,968 | 8/1908 | Cook | 355/59 |
| 1,418,690 | 6/1922 | Thurber | 355/59 |
| 3,609,036 | 9/1971 | Novak | 355/58 |
| 3,682,072 | 8/1972 | Hess | 355/58 |

Primary Examiner—Howard W. Britton
Attorney, Agent, or Firm—Robert G. Crooks; James J. Salerno, Jr.

[57] ABSTRACT

A variable magnification closed circuit television system. The system comprises an adjustment mechanism for synchronously positioning a movable lens and a separately movable camera relative to an objective so as to enable the lens either to magnify or reduce the image while always maintaining the image accurately in focus. The adjustment mechanism includes a dual track flat plate cam, one track of which is operative to position the lens and the other track of which effects positioning of the camera.

11 Claims, 7 Drawing Figures

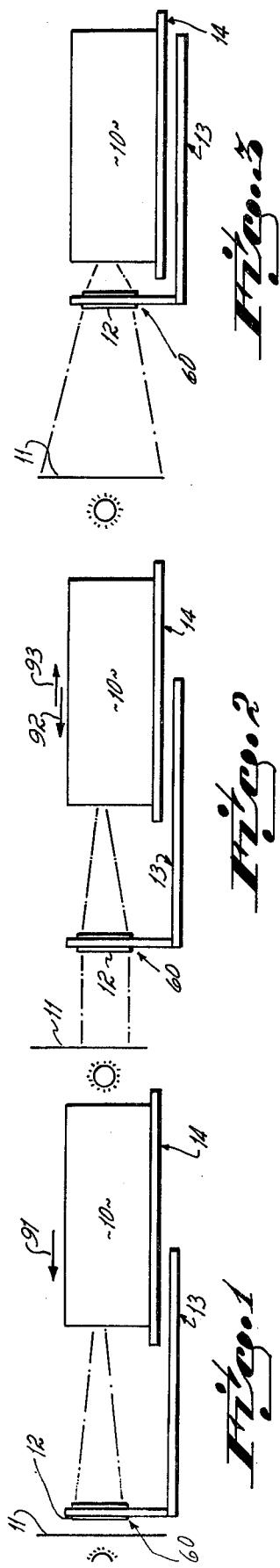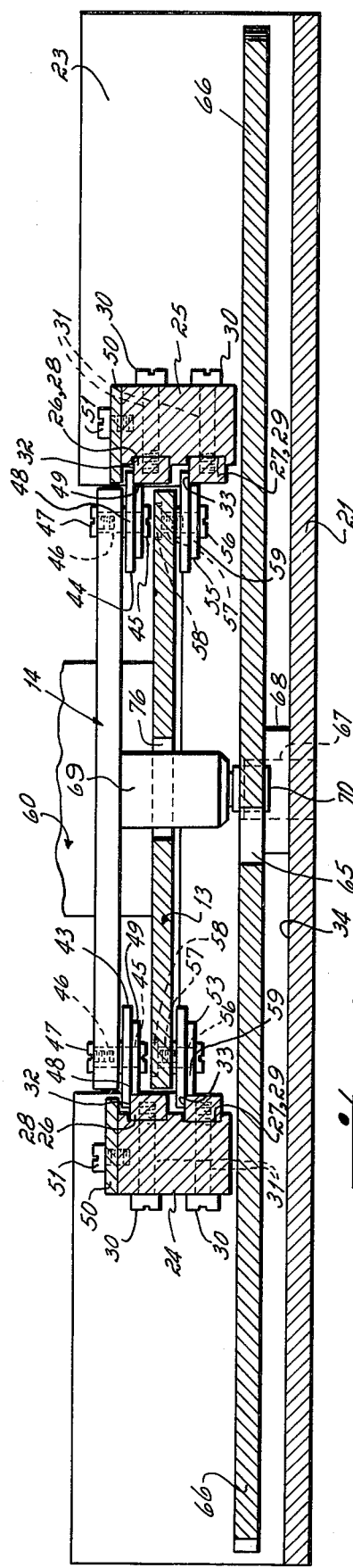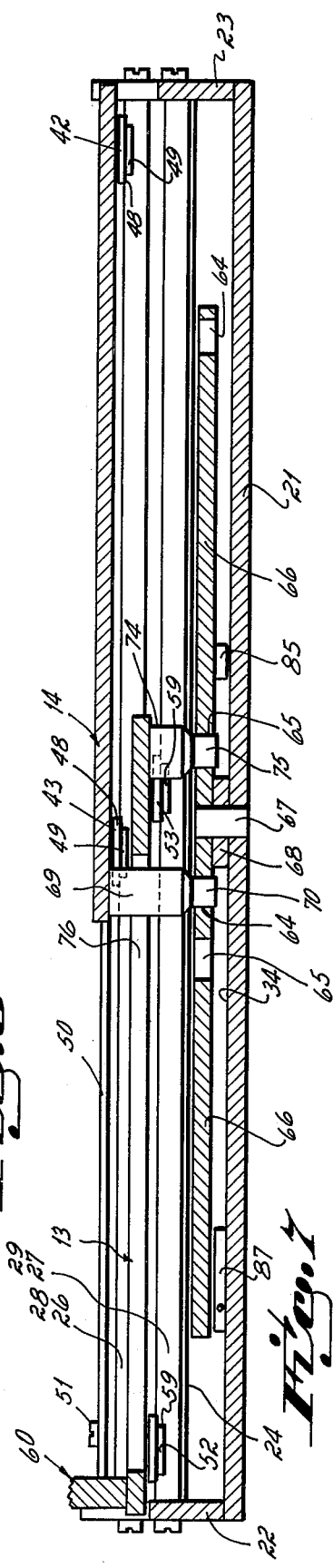

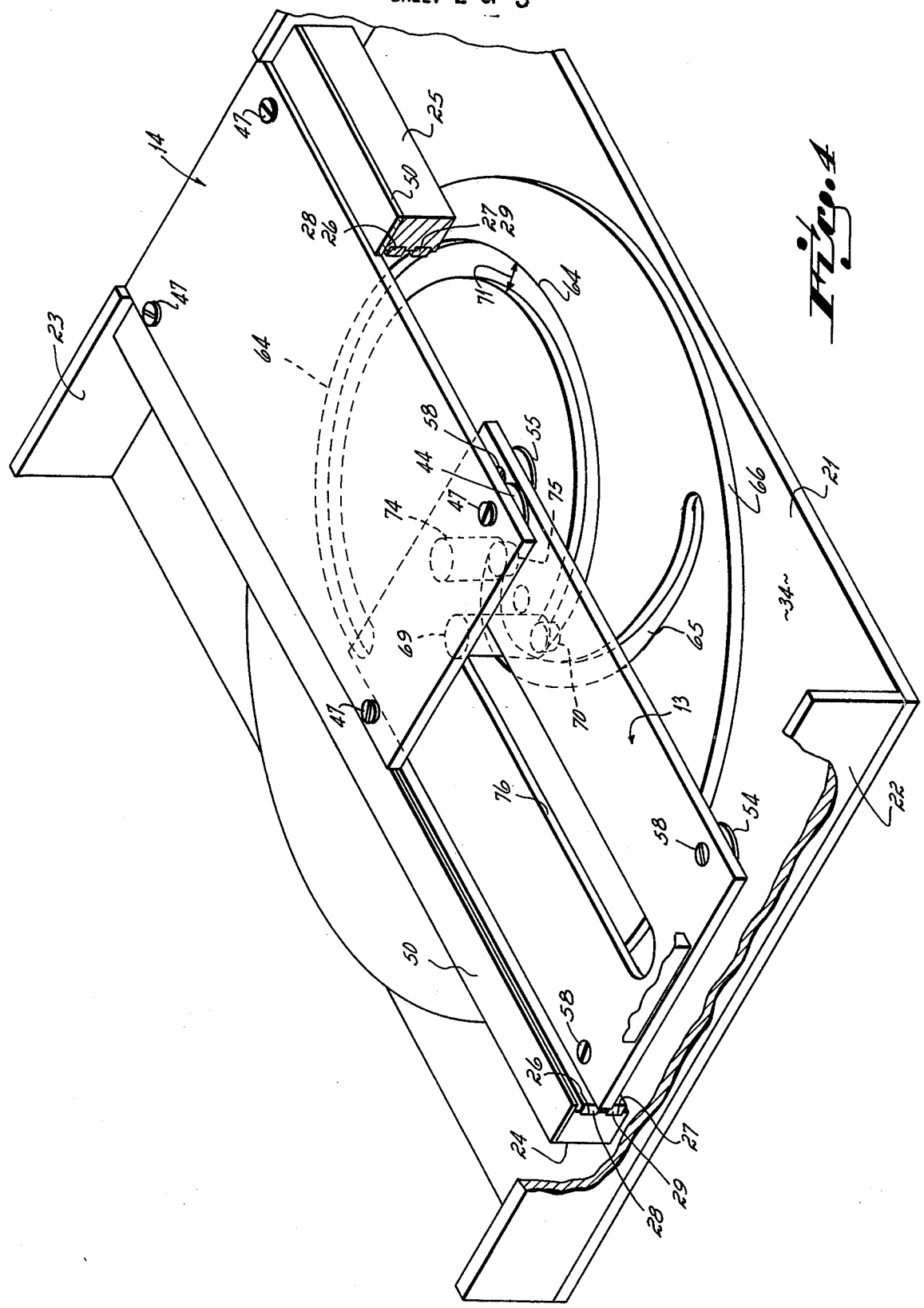

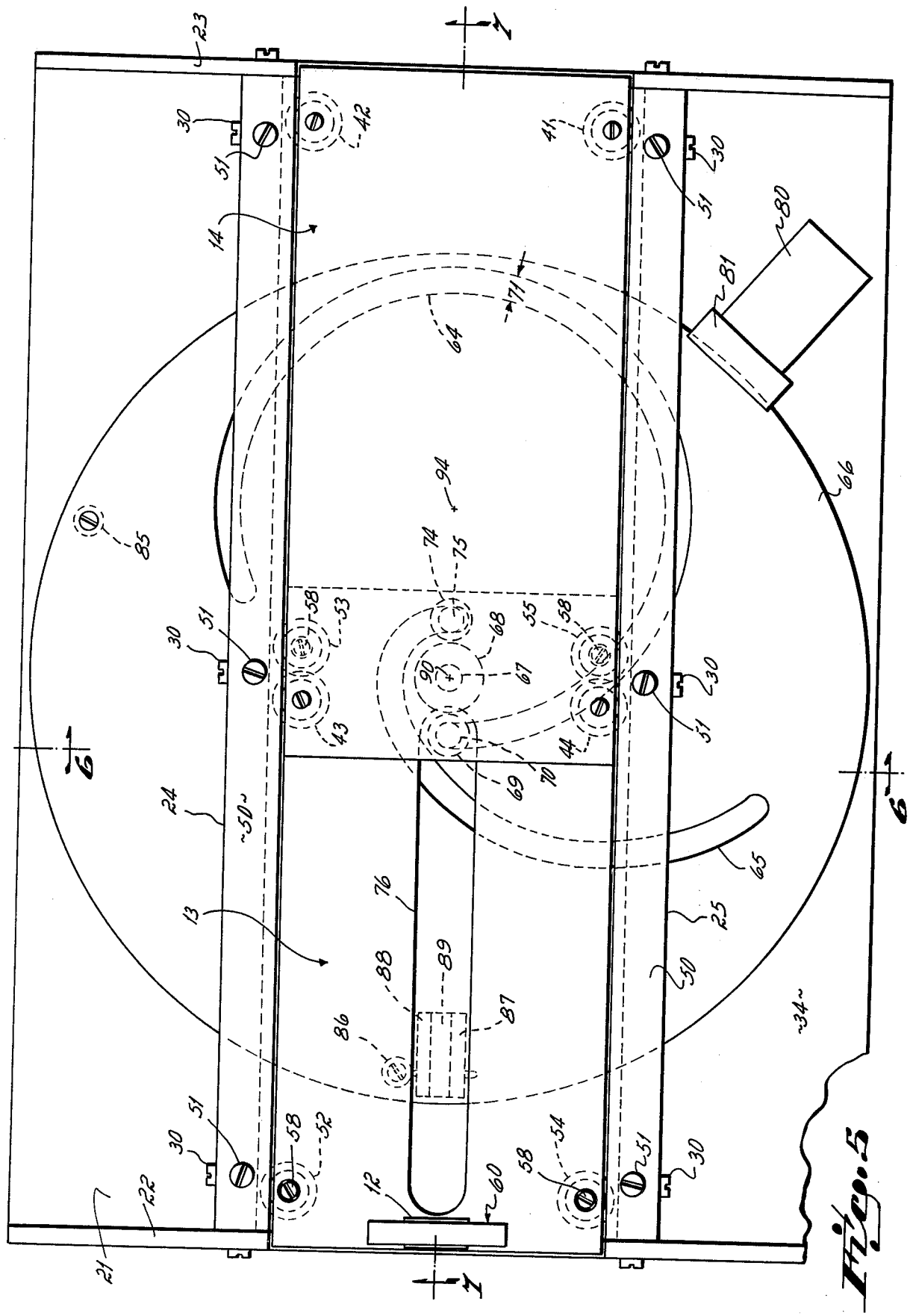

OPTICAL VIEWING SYSTEM

This invention relates to optical viewing systems and particularly to a television camera magnification or demagnification viewing system for displaying or viewing objects or film images of objects. The system is operable to accurately and synchronously position both the lens and the image display device relative to a stationary plane of the objective, or to position the lens and the plane of the objective relative to the stationary plane of the image so as to vary the magnification of the objective.

Magnification or demagnification of an objective requires simultaneous movement of the magnifying lens and of the image viewing eye or image display device, to maintain the objective in focus. The formula which determines the distance the eye or display device must be located from the lens and the lens from the objective is known as the inverse lens law formula. This law is algebraically expressed as $$1/f = 1/D_o + 1/D_i$$

where $f$ equals the focal length of the lens, $D_o$ equals the distance of the objective from the lens, and $D_i$ equals the distance of the image or eye from the lens. The magnification is determined by dividing $D_o$ by $D_i$. These same formulae obtain whether the image is viewed on a mirror or a screen, by the naked eye, on the vidicon tube of a television camera, or is recorded on film.

Within the last 15 or 20 years, closed circuit television systems have become very common and the need has grown for a variable magnification, closed circuit system which allows the viewed object to be enlarged or reduced at the will and under the control of the viewer of a closed circuit system, while always maintaining the viewed object in focus. To satisfy this need, there have been systems proposed which did magnify the objective and which to at least some degree maintained the relationship set forth above between the objective, the lens, and the camera. However, all of these systems have shortcomings, either in the range of image magnification or reduction, or in the quality of the image because of the failure of the system to accurately maintain the positional relationship called for by the formula, or in the complexity and cost of the systems. It has therefore been a primary objective of this invention to provide an optical viewing system which provides a very large range of magnification/demagnification and which very accurately maintains the focus of the image throughout this range by means of a system which is easily manufactured and assembled at a minimal cost.

Still another objective of this invention has been to provide an inexpensive and yet continuously movable optical viewing system which is capable of both image reduction and image enlargement while faithfully and accurately maintaining the focus of the image throughout the range.

I have made prior attempts to attain these same objectives. One such attempt was built, manufactured, and sold by General Precision Corporation of Pleasantville, N.Y. That system involved the use of a drum cam for synchronously controlling movement of both the viewing lens and a TV camera relative to the stationary plane of the objective. While drum cams are operable in this environment, they inherently are limited in their magnification range and, if the range is extended, either the cam becomes unreasonably large or the resolution of the focus becomes too poor to be acceptable because of cross over of the cam tracks. The drum cam is also a very expensive item to manufacture and requires complex linkages between it and the movable platen. Consequently, this General Precision manufactured system was an expensive system which had a relatively low range of magnification.

Another commercial attempt is my own system which is disclosed in U.S. Pat. No. 3,609,036. That system utilizes a moving magnifying lens under the control of a flat plate cam whose silhouette outline is followed by a roller follower attached to the lens carriage. Spring loading between the cam and the follower maintains the roller follower against the silhouette outline of the cam and insures zero backlash between the two. Simultaneously with movement of the lens, synchronous movement of a camera is effected by means of a crank arm which is driven directly from the same plate cam. This system has very accurate focal properties. It suffers though from being relatively complex and difficult to assemble. Consequently, the cost of this system is greater than optimal and service of the system is difficult.

It has therefore been another objective of this invention to provide a new optical viewing system which accomplishes the objective of providing a continuously movable optical viewing system which is capable of both image reduction and image enlargement while faithfully and accurately maintaining the focus of the image throughout the range, but a system which is less expensive to manufacture and assemble.

This objective is accomplished, and this invention is predicated upon the concept of utilizing a dual cam track in a single plate cam for controlling both lens and camera movement throughout a wide range of image reduction to image enlargement but without having the tracks cross. The use of the dual track flat plate cam to control both lens and camera displacement in such a system materially decreases the cost of manufacturing the unit and facilitates assembly and servicing of the system.

Dual track flat plate cams have been utilized before in optical viewing systems, as, for example, in U.S. Pat. No. 1,418,690. That patent discloses a photographic enlarger in which one cam track controls displacement of a lens and the other cam track controls displacement of a viewing screen. In this patent, though, the device is only capable of image enlargement and the cam followers always are located on the same side of the center of the flat plate cam. The cam of that patent cannot control demagnification because in going through the one to one relationship, it is necessary to reverse the direction of one or both cam followers.

I have determined and this invention is predicated upon the concept of a single flat plate cam for controlling both image reduction and image magnification while always maintaining the image in focus by means of a single flat plate cam having dual cam tracks, but tracks which do not cross each other. In the practice of my invention, one cam is a circular cam groove located off-center from the axis of rotation of the cam and the other is a spiral groove cam track which passes through the closed portion of the circular groove track. The circular groove track drives the television camera carriage back and forth with simple harmonic motion, while simultaneously the spiral cam groove drives the lens carriage back and forth on the optic axis while always maintaining the projected image in sharp focus in accordance with the inverse lens law formula.

The primary advantage of this invention is that it provides a relatively inexpensive, easily manufactured and easily assembled optical viewing system which is as accurate or more accurate than systems which have preceded it.

These and other objects and advantages of this invention will be more readily apparent from the following description of the drawings in which:

FIG. 1 is a diagrammatic illustration of a viewing system illustrating the relative position of the objective, the focusing lens, and the television camera for image magnification.

FIG. 2 is a view similar to FIG. 1 but illustrating the relative position of the objective, the lens, and the camera as the camera passes from image magnification to image de-magnification.

FIG. 3 is a view similar to FIG. 2 but illustrating the relative position of the objective, the lens, and the camera when the camera is in an image de-magnification position.

FIG. 4 is a perspective view, partially broken away, of the optical viewing system incorporating the invention of this application.

FIG. 5 is a top plan view of the system of FIG. 4.

FIG. 6 is a cross sectional view taken on line 6—6 of FIG. 5. FIG. 7 is a cross sectional view taken on line 7—7 of FIG. 5.

Referring first to FIGS. 1-3, it will be seen that the variable magnification, closed circuit television system utilized in one preferred application of the invention of this application comprises a television camera 10 for viewing a micro-image card or objective 11 through a magnifying lens 12. To enable the magnification of the objective 11 to be varied, the lens 12 is mounted upon a movable carriage 13 and the camera 10 is mounted upon a movable platen 14. Movement of the lens carrying carriage 13 and the camera carrying platen 14 is controlled by the adjustment mechanism depicted in FIGS. 4-7. This adjustment mechanism maintains the vidicon tube (not shown) of the television camera 10 in focus in various magnifying and demagnifying positions of the lens 12 by controlling movement of both the carriage 13 and the platen 14 in synchronization so that the vidicon tube of the camera remains in the focal plane of the image in all magnifying positions of the lens 12.

In one preferred embodiment, the objective 11 is either a microfiche film card or a card having microfilm chips mounted in apertures of the card. In either event, the card 11 is backlighted by a variable intensity light source. It is preferably movable sidewise or vertically in a single vertical plane. Both the intensity of the light and the movement of the card are automatically controlled by a drive motor synchronized with the lens position. In this preferred embodiment, the light intensity varies directly with the magnification and the edgewise translation speed of the microfilm or micro object varies inversely with the magnification. The mode of adjustment of the light intensity and the card position adjustment form no part of this invention and therefore have not been described in detail herein.

Referring now to FIGS. 4-7, it will be seen that the variable magnification adjustment mechanism of this invention comprises a base plate 21 to which there is fixedly attached a front end plate 22 and a rear end plate 23. The securement of the end plates to the base plate may be machine screws, weldments, or any other form of conventional connector. Carriage guide bars 24 and 25 are fastened between the front and back end plates 22 and 23. These guide bars 24, 25 are preferably made of aluminum and each bar has machined into its inside face two shallow grooves 26 and 27. Precision ground steel bars 28 and 29 are adjustably fastened into the grooves 26 and 27 by machine screws 30 (not shown in FIG. 4). In the preferred embodiment of the invention and as shown in FIG. 6, the grooves are slightly higher than the width of the steel bar. There are holes 31 in the guide bars 24 and 25, through which the screws 30 pass. These holes 31 are slightly larger than the diameter of the screws 30 so that, with the aid of a height gauge and dial indicator, it is possible to adjust the upper surfaces 32, 33 of each ground steel bar 28, 29 to be exactly parallel to the other and for both of them to be exactly parallel to the top surface 34 of the base 21.

The television camera platen or carriage 14 is provided with four flanged roller bearings 41, 42, 43, and 44 which depend from the four corners of the carriage. Each flanged roller bearing is secured to the carriage by a bushing 45 which is secured within a hole 46 of the carriage by a machine screw 47. The flange 48 of each roller bearing moves in sliding contact with the upper surface 32 of its corresponding bars 28, 28. In the preferred embodiment, the roller bearings are hardened, ground, and polished and the ground steel bars 28 and 29 are made from unhardened carbon steel so that the two surfaces will sustain rubbing contact without galling.

The shoulder 49 of each roller bearing 41, 42, 43, 44 is maintained in lateral rolling contact with its mating vertical surface on the corresponding ground bar 28, 28. This rolling contact is essentially wear free but is maintained with a minimum clearance between the shoulder 49 and the vertical surface so as to control and minimize lateral shift of the moving carriage. This tight tolerance is achieved by having the roller bearing bushings 45 on one side of the plate designed with fixed centers and on the other side of the plate with adjustable eccentric mounted centers. Thus, pivots or bushings for roller bearings 42 and 43 are fixed center pivots and the bushings for roller bearings 41 and 44 are eccentric mounted pivots with a total eccentricity of approximately .005 inches, just sufficient to allow the play between the roller bearings of the carriage and the corresponding guide bars to be reduced to an absolute minimum. Retainer plates 50 are fastened to the top of each guide bar 24 and 25 by machine screws 51 so as to captivate the camera carriage 14 to the guide bars and prevent the camera and carriage from being removed should the mechanism be turned upside down.

Slideable beneath the camera carriage plate 14 and forwardly of it, is the lens carriage plate 13. This latter plate 13 is provided with flanged roller bearings 52, 53, 54, and 55 identical to the flanged roller bearings of the camera carriage plate 14. These roller bearings 52-55 though are mounted for rolling movement over the lowermost opposed pair of ground steel bars 29-29, rather than over the uppermost pair 28—28. The flanged roller bearings 52-55 are also mounted on bushings 56 which pass through holes 57 in the platen 13 and are held in position by screws 58. As with platen 14, one pair of bearings, 52 and 53, are mounted on fixed center pivot bushings. The other two flanged roller bearings 54, 55 of the lens carriage platen 13 are mounted on bushings which are eccentrically adjustable. The eccentricity of the bearings of flanged rollers 54, 55 enable the shoulders 59 of the flanged bearings to be moved into close proximity to the vertical surface of the ground steel bars 29, 29 so that play between the carriage and the slides is minimized.

The lens 12 is mounted upon the lens carriage plate 13 by a lens mounting sub-assembly 60. This sub-assembly forms no part of the invention of this application and accordingly has not been illustrated and described in detail herein. Suffice it to say that it conventionally includes a mechanism for moving the lens 12 over a limited range in the vertical, horizontal, and axial directions in order to properly align it with the center of the face of the vidicon camera tube (not shown).

Movement of the camera carriage plate 14 and the lens carriage plate 13 is controlled by cam grooves 64, 65 in the top surface of a rotatable cam disc 66. In the preferred embodiment of the invention, the cam groove 64 which controls movement of the camera carriage plate 14 is a circular arc groove and the groove 65 which controls displacement of the lens carriage 13 is a spiral groove cam. To facilitate rotation of the cam disc 66, it is journaled upon a main central pivot post 67 which is secured in the base plate 21. The cam disc is spaced from the top surface of the base plate 21 by a spacer bushing 68, the top surface of which supports the bottom surface of the cam disc.

In order to effect movement of the camera carriage plate 14 by the cam groove 64, the television camera carriage plate 14 has a cam follower post 69 fastened to its front end in a downwardly depending vertical position. At its lower end, the post 69 carries a roller bearing cam follower 70. The cam groove 64 is machined to a very tight tolerance in its radial width 71 so that the clearance between it and the roller bearing cam follower 70 is not more than 0.0005 inches. This tight tolerance minimizes backlash or play in the movement of the camera carriage plate 14 in the direction of the optic axis, and in fact ensures that the backlash or play is no more than ±0.001 inches. Conventionally, the production tolerance of the focal length of the lens 12 is ±0.002 inches so that a backlash or play in the mechanical mechanism of 0.001 inches does not degrade the resolution or focus of the system.

The lens carrying carriage 13 has mounted on its rear end a downwardly depending vertical position cam follower post 74. At the lower end of the post 74, there is a roller bearing cam follower 75. Here again, the fit or clearance between the outside diameter of the hardened, ground, polished bearing 75 and the radial width of cam groove 65 is on the order of 0.0005 inches. This half-thousandths of radial play between the bearing and the cam groove is sufficient to have the cam follower run smoothly in the groove but is not so great as to deteriorate the optical performance of the system. Lens carriage plate 13 is provided with a longitudinal slot 76 through which the cam follower 69 extends. This longitudinal slot accommodates longitudinal movement of the camera carriage back and forth in the direction of the optic axis without interfering with lens carriage plate 13.

Rotation of the cam disc 66 is effected by a bi-directional electric motor 80 (FIG. 5), the output shaft of which is coupled to the disc by any conventional drive mechanism 81. Such a drive mechanism 81 may be a metal or plastic friction drive disc, a gear drive, a gear and clutch drive, a cone drive, a round or flat belt drive, or even a fine pitch gear belt drive. In the preferred embodiment, though, opposed friction discs are used to drive the disc from the motor.

To limit angular rotation of the disc to approximately 270°, limit stops are provided at the upper and lower limits of magnification. These stops 85 and 86 are positioned to engage micro switches 87 and 88 just prior to the arrival of a cam follower at the end of the cam path 64, 65. Functionally, the stops ensure that the motor 80 is electrically de-energized when the cam disc reaches the limit of rotation and before the lower cam follower reaches the end of cam path 64, 65. In the preferred embodiment, the stops 85, 86 comprise downwardly depending posts surrounded by rings engageable with actuators of micro switches 87 and 88. One stop 86 is engageable with the micro switch 88 when the disc has rotated in a counter clockwise direction to the limits of its movement (as seen in FIG. 5) and the other switch 87 is engageable by post 85 to limit rotation of the disc in a clockwise direction.

The two micro switches 87 and 88 are mounted on the opposite sides of a block 89. The block is in turn fixedly attached to the main base 21. The two micro switches 87 and 88 are electrically connected to the motor 80 so that when either one of them is actuated, it automatically de-energizes the motor 80 and through a conventional electrical control circuit, electrically switches the motor to a condition in which it will when next energized move the cam disc in the opposite direction or away from the limit switch which effected the de-energization of the motor. In this way no stress is ever placed upon the cam or the respective roller followers.

In operation, the cam disc is operable through the cam groove to drive the camera carriage 14 and the lens carriage 13 from a position in which the lens demagnifies the image of an object 11 on the vidicon tube of the camera to a position in which the lens magnifies the image of the objective. In the preferred embodiment, the lens carriage and camera carriage are caused to move simultaneously while always remaining in sharp focus from an object to image ratio which varies from under 1:1 with demagnification of about 5x, through 1:1, to a position with magnification of about 5x. A closed circuit television system using a 21 inch monitor will have a fixed magnification of about 10:1; therefore, the overall range of magnification should be about 250:1 with the complete system illustrated in FIGS. 1–3.

As shown in FIG. 1, the camera and lens are in the positions of maximum magnification and the cam and cam followers are in the position depicted in FIGS. 4, 5 and 7. From this position of maximum magnification, upon rotation of the cam in the clockwise direction (as viewed in FIGS. 4 and 5) the cam followers and consequently the operatively attached carriages 14 and 13 are moved away from a position of maximum magnification toward a position of 1:1 ratio of object to image size (FIG. 2). During the first 90° of motion from the position depicted in FIG. 4, the lens carriage 13 remains in approximately the same position while the camera carriage 14 moves through a substantial increment of movement forwardly or toward the lens 12, as indicated by the arrow 91.

During the next 180° of rotation of the cam disc 66, as the lens and camera move through a 1:1 object to image size ratio (FIG. 2) to a position of maximum demagnification of the image (FIG. 3), the lens carriage 13 is caused to move rearwardly and bring the lens 12 toward the axis 90 of the cam disc while simultaneously the camera carriage 14 moves first toward the lens 12 and then rearwardly away from it as indicated by the arrows 92, 93 of FIG. 2.

In order to generate the cam surfaces 64, 65 in the top surface of the cam disc 66, a computer is used to plot points in the spiral cam groove 65 against a sine motion curve, the individual points of which are chosen for a circular path cam groove, the center 94 of which is located in the vertical plane of the optical axis of the system and a fixed distance from the axis 90 of the disc 66. In one preferred embodiment of the invention the center of rotation 94 of the cam groove 64 is located 3 inches from the axis 90 of the cam disc and both are located in the vertical plane of the optical axis of the system. The computer then calculates the spiral cam groove points of the cam groove 65 in accordance with the inverse lens law formula $$1/f = 1/D_o + 1/D_i$$

These plots then generate the curve of the cam surface 65.

The primary advantage of this invention is that it provides a high ratio image demagnification to image magnification system which accurately maintains the image in focus throughout the wide range of image magnification and demagnification with a relatively inexpensive system. The heart of the system is the dual cam groove plate cam which is operative to control movement of the cam and the camera through a wide range of movement in which the camera at times occupies the same position relative to the object as is occupied by the lens in other image magnification or demagnification positions of the system. This is accomplished by the dual paths of the cam groove in the flat planar surface of the cam without any necessity for the grooves to cross each other. Of course, if the cam grooves cross, there would be a position at the intersection of the grooves where the image would go out of focus and where the cam followers could conceivably be forced out of the proper groove. The primary advantage of this invention is the reduction in cost which it achieves over all of the systems which preceded it for accomplishing this same wide range of image magnification to demagnification. Another advantage of the system is the ease with which it may be assembled and disassembled relative to the systems which have preceded it.

While I have described only a single preferred embodiment of my invention, persons skilled in the art to which it pertains will readily appreciate numerous changes and modifications which may be made without departing from the spirit of my invention. Therefore, I do not intend to be limited except by the scope of the following appended claims.

I claim:

1. A variable magnification optical viewing system for viewing a magnified objective comprising
    a display device supporting platen reciprocable in a first path of movement,
    a display device mounted upon said platen, said device having a display surface located in an image focal plane,
    a lens supporting carriage reciprocable in a second path of movement parallel to said first path of movement of said platen,
    a lens mounted upon the carriage between the display device and the objective, said lens having an optical axis located parallel to said first and second paths of movement of said platen and carriage,
    focusing means for continuously maintaining the focus of the objective on the display surface throughout a magnification range which varies from less than 1 to more than 1, said focusing means including
    means for moving the display device supporting platen and the lens supporting carriage in synchronization along said paths of movement, said moving means comprising a flat plate cam having a pair of discrete separated cam grooves within each one of which there is a cam follower, one of said cam followers being operatively connected to said display device supporting platen and the other of said cam followers being operatively connected to said lens supporting carriage such that rotary movement of the cam effects precise movement of the lens carriage and the display device supporting platen.

2. The variable magnification optical viewing system of claim 1 in which one of said cam grooves is generally shaped as an arc of a circle and the other of said cam grooves is generally shaped as a segment of a spiral.

3. The variable magnification optical viewing system of claim 2 in which said circular arc shaped cam groove describes an arc of more than 180° but less than 360° so that there is a closed section of the arc between the ends of the groove.

4. The variable magnification optical viewing system of claim 3 in which said spiral shaped cam groove passes through said closed section of said circular arc shaped cam groove.

5. The variable magnification optical viewing system of claim 4 in which said circular arc shaped groove is circumscribed about an axis which intersects said optical axis of said carriage mounted lens.

6. A variable magnification optical viewing system for viewing a magnified objective comprising
    a supporting platen reciprocable along a first path of movement,
    a display device, said device having a display surface located in an image focal plane,
    a lens supporting carriage reciprocable along a second path of movement parallel to said first path of movement of said platen,
    a lens mounted upon the carriage between the display device and the objective,
    focusing means for continuously maintaining the focus of the objective as viewed on said display surface throughout a magnification range which varies from less than 1 to more than 1, said focusing means including means for moving the supporting platen and the lens supporting carriage in synchronization along said paths of movement, said moving means including a rotatable flat plate cam having a pair of non-intersecting grooves defined in one surface thereof and a pair of cam followers movable within said cam grooves, one of said cam followers being operatively connected to said lens supporting carriage and the other of said cam followers being operatively connected to said supporting platen so that rotary movement of the cam effects precise movement of the lens carriage and the supporting platen while maintaining precise focus of the objective as viewed on the display surface of said display device throughout the complete magnification range of said system.

7. The variable magnification system of claim 6 in which said lens has an optical axis extending parallel to said paths of movement of said platen and said carriage.

8. The variable magnification optical viewing system of claim 7 in which one of said cam grooves is generally shaped as an arc of a circle and the other of said cam grooves is generally shaped as a segment of a spiral.

9. The variable magnification optical viewing system of claim 8 in which said circular arc shaped cam groove describes an arc of more than 180° but less than 360° so that there is a closed section of the arc between the ends of the groove.

10. The variable magnification optical viewing system of claim 9 in which said spiral shaped cam groove passes through said closed section of said circular arc shaped cam groove.

11. The variable magnification optical viewing system of claim 10 in which said circular arc shaped groove is circumscribed about an axis which intersects said optical axis of said carriage mounted lens.

* * * * *